(No Model.)
J. T. DONOHUE.
TACKLE BLOCK.
No. 599,122.             Patented Feb. 15, 1898.
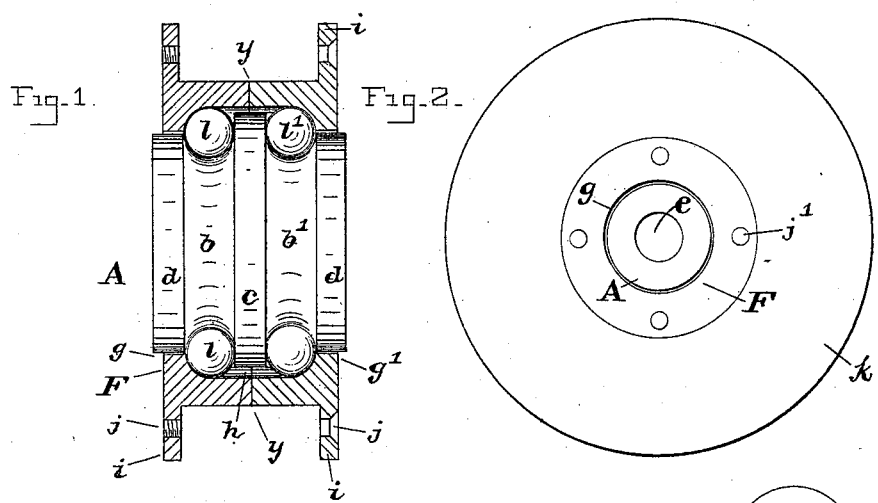
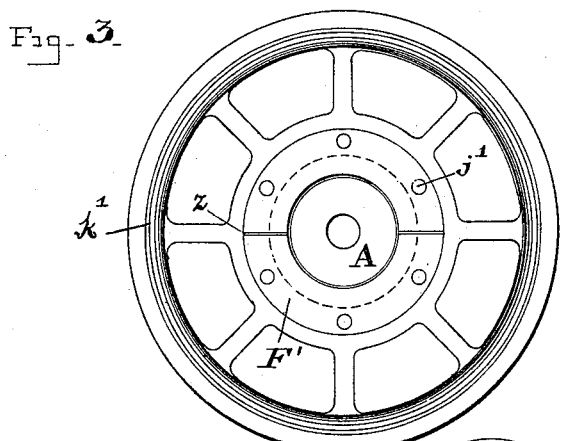
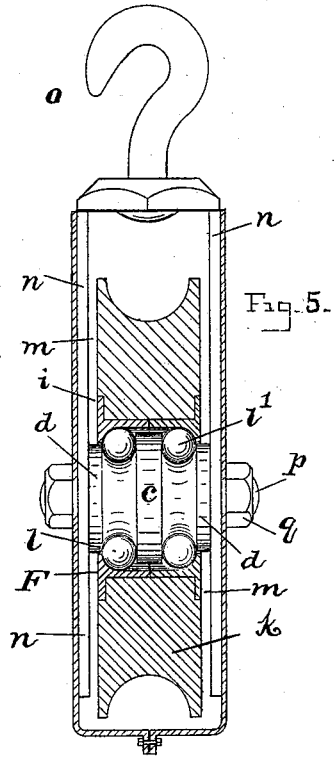
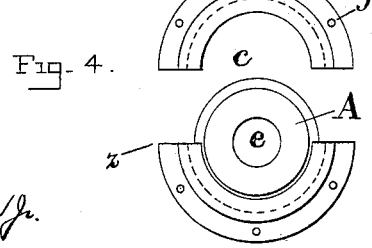
WITNESSES
Charles B. Mann Jr.
Chapin A. Ferguson
INVENTOR
John T. Donohue
By Chas. B. Mann
ATTORNEY
THE NORRIS PETERS CO., PHOTO-LITHO., WASHINGTON, D. C.

UNITED STATES PATENT OFFICE.

JOHN T. DONOHUE, OF BALTIMORE, MARYLAND.

TACKLE-BLOCK.

SPECIFICATION forming part of Letters Patent No. 599,122, dated February 15, 1898.

Application filed February 23, 1897. Serial No. 624,529. (No model.)

*To all whom it may concern:*

Be it known that I, JOHN T. DONOHUE, a citizen of the United States, residing at Baltimore, in the State of Maryland, have invented certain new and useful Improvements in Tackle-Blocks, of which the following is a specification.

This invention relates to an improved ball-bearing tackle-block, which is hereinafter first described and then claimed.

The invention is shown in the accompanying drawings, in which—

Figure 1 is a diametrical section of the bushing and showing the balls and hub. Fig. 2 is a side view of a wood sheave having my improved flanged bushing and ball-bearing hub. Fig. 3 shows a side view of a metal sheave with my improvement. Fig. 4 shows the hub and flanged bushing divided diametrically into two parts, as in Fig. 3. Fig. 5 shows the complete tackle-block of the wood type shown in Fig. 2, the parts being in section except the hub.

The letter A designates a hub having around it two grooves $b$ $b'$, which are separated by a central circumferential flange $c$, and each end of the hub has a flange $d$ of less diameter than the said central flange. The hub has a hole $e$ centrally through it. A bushing F surrounds the hub and has on two sides an inward-projecting circular flange $g$ $g'$, each of which surrounds one of the end flanges $d$ of the hub, so as to turn around the hub without making contact therewith. Within the bushing and between said two side flanges $g$ is an internal groove $h$, which is deep enough to receive and afford room for the central flange $c$ on the hub. The bushing has two circular outward-projecting flanges $i$, which have holes $j$ to receive rivets or screws $j'$, which secure said flanges to the wood sheave $k$. The bushing is divided into two parts. In Figs. 1, 2, and 5 the line of division $y$ is circumferential, so that each of the two circular sides having one of the outward flanges $i$ constitutes a separate piece. The line of division $y$ is directly over the central flange $c$ of the hub. Two series of balls are employed. One series, $l$, fit in the groove $b$ of the hub and bear against the flange $g$ at one side of the bushing, while the other series, $l'$, fit in the hub-groove $b'$ and bear against the other flange $g'$ of the bushing. The bushing F revolves freely and truly around the hub. As the two series of balls fit accurately and each series bears against the inner part of one of the two side flanges $g$ $g'$ the bushing cannot wabble or move laterally on the hub. The side flanges $i$ of the bushing are flush with the sides of the wood sheave and, as already stated, are secured to the sheave by screws $j'$. The length of the hub A or its axial measurement is greater than the thickness of the bushing F, so that the hub ends project beyond the sides of the bushing, as plainly shown in Figs. 1 and 5. This construction is of advantage, because as the projecting hub ends come in contact with the strap or cheek-pieces of the tackle-block a narrow space $m$ (see Fig. 5) is assured at each side of the bushing and sheave and between them and said strap or cheek-pieces. Consequently the revolving bushing will cause no rubbing friction whatever.

The strap $n$ and hook $o$ may be of any preferred construction, and a bolt $p$ passes through the strap and through the hole $e$ in the hub and is secured by a nut $q$ or other means. The nut and bolt will cause the strap to clamp the ends of the hub and prevent its revolution on the bolt, thereby saving the latter from wear.

In the case of a metal sheave $k'$ the bushing F' is divided on a diametrical line $z$. (See Figs. 3 and 4.) The hub and two series of balls, however, are just the same and are arranged in the bushing the same as in Fig. 1. In this case the bushing has only one outward-projecting flange $i$ instead of two, as in Figs. 1 and 2.

The central circumferential flange $c$ on the hub has a greater diameter than the two end flanges $d$. This construction has several advantages. First, in assembling the parts to their respective positions the hub may be laid or held with one end uppermost, thus placing the flange $c$ horizontal. In this position the balls for one groove may be placed on the upper side of the said flange $c$, which, by reason of the said greater diameter, will hold or retain the balls. Then one part of the bushing F, Fig. 1, may be placed down over said uppermost end of the hub and cover the balls. Then the hub and said one part of the bushing may be reversed or turned upside down and balls for the other groove placed again on the upper side of the flange c, and then the other part of the bushing can be placed in position. Another advantage of the greater diameter of the larger central flange c, revolving in the internal groove h of the two-part bushing, is that the pressure on the two series of balls is on diagonal lines or lines inclining opposite ways from the base of central flange c to the two inward-projecting flanges g g', respectively, on the bushing. This results in a smooth steady revolution of the bushing and sheave without side motion or lateral play.

Having thus described my invention, what I claim is—

In a tackle-block, the combination of a strap or cheek-pieces; a hub whose ends are in contact with said strap or cheek-pieces and which has around it two grooves separated by a central circumferential flange and each end of the hub having a circumferential flange of less diameter than said central flange; a sheave; a bushing in the sheave and surrounding the hub and divided into two equal parts and having two circular side flanges, g, g', surrounding the said hub ends and with the hub ends projecting beyond the said side flanges, and an internal groove, h, which surrounds said central flange on the hub; and two series of balls each series fitting in a different groove on the hub and bearing against a different one of the said inward-projecting circular flanges on the bushing—a space being left at each side of the sheave and bushing and between them and the said strap or cheek-pieces, whereby the revolving sheave and bushing will cause no rubbing friction, as set forth.

In testimony whereof I affix my signature in the presence of two witnesses.

JOHN T. DONOHUE.

Witnesses:
CHAPIN A. FERGUSON,
CHARLES B. MANN, Jr.